United States Patent Office 3,234,311
Patented Feb. 8, 1966

3,234,311
METHOD OF MOLDING COMPOSITIONS CONTAINING POLYTETRAFLUOROETHYLENE
George Christopher Pratt, Kenneth Howie McNeil, and Hillary Mervyn Sharpe, Alperton, Wembley, England, assignors to The Glacier Metal Company Limited, Alperton, Wembley, England, a company of Great Britain
No Drawing. Filed July 26, 1963, Ser. No. 297,980
Claims priority, application Great Britain, July 26, 1962, 28,791/62
10 Claims. (Cl. 264—127)

This invention relates to compressed compositions containing polytetrafluoroethylene (hereinafter called PTFE) and a lead compound, and to methods of making them.

It has been discovered that with such compositions, a highly exothermic reaction takes place between the lead compound and the PTFE during sintering at temperatures of about 380° C. or lower and an object of the invention is to enable such compositions to be compressed without the reaction taking place, or substantially without it taking place.

According to the present invention, in a method of manufacturing a compressed composition containing PTFE and a lead compound, an oxidizing agent is mixed with the other components.

It seems that the oxidizing agent retards the reaction or may completely prevent it occurring.

Aluminium nitrate is one suitable oxidizing agent which has been used, but other oxidizing agents are expected to be satisfactory.

The invention includes compressed compounds made by a method as defined above.

The invention may be carried into practice in various ways and two specific examples will now be described by way of example.

*Example 1*

In this example the basic composition of a material for making plain bearings was

| | Percent |
|---|---|
| PTFE | 60 |
| $Pb_3O_4$ (red lead) | 20 |
| $Mg_2P_2O_7$ (magnesium pyrophosphate) | 20 |

Various amounts of the oxidizing agent $Al(NO_3)_3$ were included with the other components and a number of sticks were formed by pressing the powdered mixture at 20000 pounds per square inch. Each stick was drilled and a thermo-couple was inserted in the drilling and the sticks were placed in a tray in an air-circulating oven which was set at 380° C.

If the reaction occurred in any stick, the heat generated was detected by the thermo-couple which thus gave an indication whether the reaction was occurring or not.

In sticks containing no aluminium nitrate, the reaction time was between 80 and 90 minutes.

Sticks containing a percentage by weight of aluminium nitrate based on the weight of aluminium nitrate used per 100 grammes of PTFE of between 0.324 and 4.54 indicated no reaction after twenty hours. The stick had an overall grey appearance.

Sticks containing aluminium nitrate in excess of 27.8% also showed no reaction after twenty hours, but the stick had small grey patches on it, although there was very little discolouration of the red lead.

*Example 2*

In this example the basic composition of a material for making plain bearings was

| | Percent |
|---|---|
| PTFE | 60 |
| $Pb_3O_4$ | 37½ |
| Bronze | 2½ |

2% by weight of the PTFE of the oxidizing agent antimony pentoxide $Sb_2O_5$ was included with the other components.

Then all the components were sintered at 380° C.

What we claim as our invention and desire to secure by Letters Patent is:

1. A method of manufacturing a compressed composition consisting essentially of polytetrafluoroethylene, an oxide of lead and bronze in which an oxidizing agent of up to 5% by weight of PTFE is mixed with the other components and all the components are sintered at a temperature of up to 380° C.
2. A method as claimed in claim 1 in which the composition contains 60% of polytetrafluoroethylene.
3. A method as claimed in claim 2 in which the composition contains 2½% of bronze.
4. A method of manufacturing a compressed composition consisting essentially of polytetrafluoroethylene, an oxide of lead, and magnesium pyrophosphate in which an oxidizing agent of up to 5% by weight of PTFE is mixed with the three other components and all the components are sintered at a temperature of up to 380° C.
5. A method as claimed in claim 4 in which the composition contains 60% of polytetrafluoroethylene.
6. A method as claimed in claim 1 in which the oxidizing agent is aluminium nitrate.
7. A method as claimed in claim 1 in which the oxidizing agent is antimony pentoxide.
8. A method of manufacturing a compressed composition consisting essentially of polytetrafluoroethylene and a lead oxide in which an oxidizing agent is mixed with the other components, and the components are sintered at a temperature of up to 380° C.
9. A method as claimed in claim 8 in which the oxidizing agent is aluminium nitrate.
10. A method as claimed in claim 8 in which the oxidizing agent is antimony pentoxide.

References Cited by the Examiner
UNITED STATES PATENTS
2,456,262 12/1948 Fields _____ 75—214
FOREIGN PATENTS
610,507 10/1960 Italy.

ALEXANDER H. BRODMERKEL, *Primary Examiner.*
CARL D. QUARFORTH, *Examiner.*
R. L. GOLDBERG, P. E. ANDERSON, *Assistant Examiners.*